United States Patent
Papakipos et al.

(10) Patent No.: US 10,728,442 B2
(45) Date of Patent: *Jul. 28, 2020

(54) INITIALIZING CAMERA SUBSYSTEM FOR FACE DETECTION BASED ON SENSOR INPUTS

(71) Applicant: Facebook, Inc., Menlo Park, CA (US)

(72) Inventors: Matthew Nicholas Papakipos, Portola Valley, CA (US); David Harry Garcia, Campbell, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/923,786

(22) Filed: Mar. 16, 2018

(65) Prior Publication Data

US 2018/0205880 A1 Jul. 19, 2018

Related U.S. Application Data

(63) Continuation of application No. 15/423,411, filed on Feb. 2, 2017, now Pat. No. 9,955,067, which is a
(Continued)

(51) Int. Cl.
*H04N 5/232* (2006.01)
*H04N 5/225* (2006.01)
(Continued)

(52) U.S. Cl.
CPC ......... *H04N 5/23219* (2013.01); *G06F 1/169* (2013.01); *G06F 1/1686* (2013.01);
(Continued)

(58) Field of Classification Search
CPC ..... H04L 9/32; H04L 9/3231; H04L 63/0861; H04L 63/107; H04N 5/23219;
(Continued)

(56) References Cited

U.S. PATENT DOCUMENTS

| 6,930,707 B2 * | 8/2005 | Bates ................. G06K 9/00597 348/161 |
| 8,028,896 B2 * | 10/2011 | Carter ............... G06Q 10/0633 235/379 |

(Continued)

OTHER PUBLICATIONS

Smartphone Definition—Wikipedia—wayback machine date: Sep. 5, 2011 https://en.wikipedia.org/wiki/smartphone pp. 1-6 (Year: 2011).*

*Primary Examiner* — Twyler L Haskins
*Assistant Examiner* — Akshay Trehan
(74) *Attorney, Agent, or Firm* — Jordan IP Law, LLC

(57) ABSTRACT

In one embodiment, a method comprises monitoring one or more sensors of a computing device that is in a locked state and is associated with an authorized user of a social-networking system, identifying, based on information associated with the authorized user, content to be downloaded from the social-networking system, and downloading the identified content from the social-networking system, wherein the identified content is stored for display after the computing device is unlocked. The downloading may be in response to determining that an operation to unlock the computing device is imminent, and the content may include commonly-viewed content. The downloading may include downloading one or more notifications from the social-networking system. The downloading may be based on one or more previous habits of the authorized user. The information associated with the authorized user may include information indicating that the authorized user habitually checks one or more sites or feeds.

19 Claims, 2 Drawing Sheets

Related U.S. Application Data continuation of application No. 13/229,327, filed on Sep. 9, 2011, now Pat. No. 9,596,084.

(51) Int. Cl.

| | | |
|---|---|---|
| *H04N 7/18* | (2006.01) | |
| *G06F 21/30* | (2013.01) | |
| *G06F 3/038* | (2013.01) | |
| *G06F 1/16* | (2006.01) | |
| *H04L 29/06* | (2006.01) | |
| *H04L 9/32* | (2006.01) | |

(52) U.S. Cl.
CPC ............ *G06F 1/1694* (2013.01); *G06F 3/038* (2013.01); *G06F 21/30* (2013.01); *H04L 9/32* (2013.01); *H04L 9/3231* (2013.01); *H04L 63/0861* (2013.01); *H04L 63/107* (2013.01); *H04N 5/225* (2013.01); *H04N 5/232* (2013.01); *H04N 5/23293* (2013.01); *H04N 7/183* (2013.01); *G06F 1/1613* (2013.01); *G06F 2203/0381* (2013.01)

(58) Field of Classification Search
CPC .. H04N 5/23293; H04N 5/2258; H04N 5/225; H04N 7/183; G06F 1/1694; G06F 1/1613; G06F 1/1686; G06F 21/30
See application file for complete search history.

(56) References Cited

U.S. PATENT DOCUMENTS

| | | | |
|---|---|---|---|
| 8,346,217 B2 * | 1/2013 | Crawford | H04W 12/06 455/410 |
| 2005/0185063 A1 * | 8/2005 | Ikehata | H04N 5/232 348/222.1 |
| 2008/0006762 A1 * | 1/2008 | Fadell | G01J 1/4204 250/201.1 |
| 2008/0214156 A1 * | 9/2008 | Ramer | G06F 17/30749 455/414.1 |
| 2009/0160609 A1 * | 6/2009 | Lin | G06F 21/32 340/5.83 |
| 2009/0221312 A1 * | 9/2009 | Franklin | H04L 51/38 455/466 |
| 2010/0036912 A1 * | 2/2010 | Rao | H04L 51/20 709/204 |
| 2011/0165890 A1 * | 7/2011 | Ho | G01C 21/265 455/456.1 |
| 2011/0187497 A1 * | 8/2011 | Chin | G06F 21/00 340/5.54 |
| 2012/0009896 A1 * | 1/2012 | Bandyopadhyay | G06F 1/1643 455/411 |
| 2012/0041982 A1 * | 2/2012 | Jennings | G06F 17/30265 707/784 |
| 2012/0075452 A1 * | 3/2012 | Ferren | G02B 13/0065 348/78 |
| 2012/0235790 A1 * | 9/2012 | Zhao | G06F 21/32 340/5.83 |
| 2012/0259707 A1 * | 10/2012 | Thielke | G06Q 30/02 705/14.64 |

* cited by examiner

INITIALIZING CAMERA SUBSYSTEM FOR FACE DETECTION BASED ON SENSOR INPUTS

PRIORITY

This application is a continuation under 35 U.S.C. § 120 of U.S. patent application Ser. No. 15/423,411, filed 2 Feb. 2017, which is a continuation under 35 U.S.C. § 120 of U.S. patent application Ser. No. 13/229,327, filed 9 Sep. 2011, now U.S. Pat. No. 9,596,084.

TECHNICAL FIELD

This disclosure generally relates to mobile electronic devices and more specifically relates to automatically priming the camera subsystem of a mobile device based on detected events in preparation for an image-based unlocking operation.

BACKGROUND

A mobile electronic device, such as a smartphone, tablet, notebook computer, etc., may have multiple operation states. For example, while a mobile device is not being used by its user, it may be in a power-saving or sleep state (e.g., the screen is dim or dark) in order to decrease power-consumption level and prolong battery life. In some cases, the mobile device may also be in an input locked state (e.g., the touchscreen or keypad of the mobile device is locked) so that the mobile device does not perform unintentional or accidental operations. In other cases, the mobile device may be security locked, such that a user is required to provide a correct password or personal identification number (PIN) in order to unlock and use the device. The advent of optical face or iris detection and recognition obviates the need for physical manipulation of a touchscreen or keypad to unlock mobile devices.

SUMMARY

This disclosure generally relates to mobile electronic devices and more specifically relates to automatically initializing the camera subsystem of a mobile electronic device based on a detected sensor inputs.

In particular embodiments, a mobile electronic device detects the angular acceleration about one or more axis from an accelerometer or gyrometer in a sensor hub indicative of a user picking up the mobile device. In particular embodiments, a mobile device detects a transition from a low-light to high-light environment via a light sensor in a sensor hub indicative of a user removing the mobile device from a pocket, bag, or case. In particular embodiments, a mobile device detects a transition from having nearby objects to having no nearby objects via a proximity sensor indicative of the mobile device being removed from a pocket, bag, or case. In particular embodiments, a mobile device detects a transition from a low volume to high volume environment via a microphone indicative of the mobile device being removed from a pocket, bag, or case. In particular embodiments, a mobile device detects a transition from muffled audio to clear audio via a microphone indicative of removal of the mobile device from a pocket or bag. In particular embodiments, any combination of the previous sensor transitions may be utilized to determine that the user is about to look at the mobile device, and may trigger an operation to initialize the camera subsystem of the mobile device. In particular embodiments, upon camera initialization, the camera continuously monitors its input for the presence of a face. In particular embodiments, facial recognition is utilized to unlock the mobile device. In particular embodiments, the camera captures a photo of the user and prompts the user as to whether he or she would like to use the photo as a profile picture on a social network. In particular embodiments, the mobile device automatically uploads the captured photo to the user's profile page on a social network.

These and other features, aspects, and advantages of the disclosure are described in more detail below in the detailed description and in conjunction with the following figures.

DESCRIPTION OF EXAMPLE EMBODIMENTS

Figure 1:
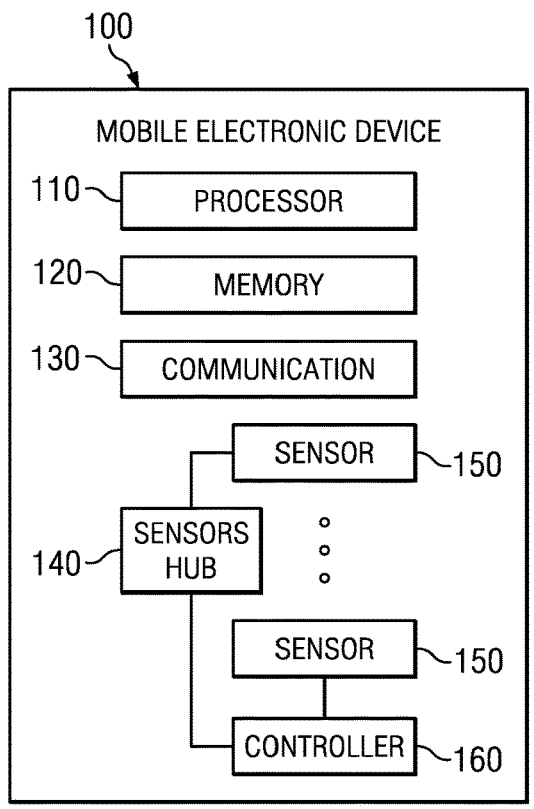
FIG. 1 illustrates an example mobile electronic device.

This disclosure is now described in detail with reference to a few embodiments thereof as illustrated in the accompanying drawings. In the following description, numerous specific details are set forth in order to provide a thorough understanding of this disclosure. However, this disclosure may be practiced without some or all of these specific details. In other instances, well known process steps and/or structures have not been described in detail in order not to unnecessarily obscure this disclosure. In addition, while the disclosure is described in conjunction with the particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

A mobile electronic device, such as a smartphone, tablet or notebook, may have multiple operation states. For example, when a mobile device has not being used by its user for a period of time (e.g., a few seconds), it may enter into a power-saving state. At the power-saving state, the mobile device may operate at a lower power level in order to save energy and prolong battery life. The screen of the mobile device may be dim or dark. To bring the mobile device out of the power-saving state into the normal power state, the user may need to perform an action with the mobile device (e.g., pushing the power button of the mobile device). In some cases (e.g., after the mobile device is in the power-saving state for a few seconds), the mobile device may also enter into an input-lock state. At the input-lock state, the input component (e.g., keypad or touch-sensitive screen) of the mobile device may be locked to prevent accidental inputs causing unintentional operations. To unlock the keypad or screen of the mobile device, the user may need to perform another action with the mobile device. For example, if the mobile device has a keypad, the user may need to push a key. If the mobile device has a touch-sensitive screen, the user may need to press a control to power up the device and make a swipe gesture on the screen. In addition, the mobile device may have a security-lock state. At the security-lock state, the mobile device is password or PIN (Personal Identification Number) locked to prevent unauthorized access to and usage of the mobile device. To unlock the mobile device, the user may need to enter the appropriate password or PIN. When the mobile device is being actively used by its user, it may be in a normal operation state (e.g., operating at the full power level and ready to receive user inputs). In some cases, the mobile device may be in an operation state where its audio output is turned on, an operation state where its audio output is turned off, or an operation state where its audio output is in a specific mode (e.g., loud, quiet, vibrate, etc.). Other operation states may also be possible, and this disclosure contemplates any applicable operation state.

At any given time, a mobile device may be in any one of the operation states, depending on, for example, whether the user is currently using the mobile device, the amount of time passed since the user's last use of the mobile device, the location of the mobile device (e.g., in a carrying case, in the user's pocket or purse, etc.).

For example, suppose that the user has not used his mobile device (e.g., an Apple iPhone) for some time and the mobile device has been stored in the user's pocket. In this case, the mobile device is most likely in the power-saving state to save battery as well as the input-lock state to prevent accidental inputs. In addition, the mobile device may also be in the security-lock state to prevent unauthorized access to the mobile device. Further suppose that the user now wishes to use his mobile device. The user may need to: (1) take the mobile device out of his pocket; (2) push the power button to bring the mobile device out of the power-saving state; and (3) swipe the touch screen to unlock the input component of the mobile device. In addition, if the mobile device is security locked as well, then the user also needs to enter the password or PIN to unlock the mobile device. At least, the user needs to perform a few actions, which may take several seconds, before the mobile device is ready to be used. Considering that such a sequence of actions may need to be performed several times a day (e.g., each time the user needs to use his mobile device after not using the mobile device for a period of time), it may become inefficient and time consuming.

Recent advances in face recognition technology greatly simplifies the unlocking process by utilizing a front-facing camera in a mobile device to capture an image of the user's face, match it against a known database of authorized users, and unlock the phone if the current user's face matches one of the faces in the database. Other camera-based implementations utilize iris detection rather than facial detection. However, current implementations, such as the RecognizeMe application for iOS or Recognizr, Visidon, and BioLock applications for Google Android OS, still require that the user swipe the touchscreen to initiate the process. Additionally, current implementations only activate the camera subsystem after the user has swiped the touchscreen, resulting in delays while the operating system initializes and readies the front-facing camera for image capture.

Therefore, particular embodiments may automatically initialize the camera subsystem of a mobile device in the locked mode in anticipation of a likely unlock operation based upon one or more inputs to its sensor hub. In particular embodiments, a mobile electronic device, such as a mobile device, may include various types of sensors, such as, for example and without limitation, touch sensors (disposed, for example, on a display of the device, the back of the device and/or one or more lateral edges of the device) for detecting a user touching the surface of the mobile electronic device (e.g., using one or more fingers), accelerometer for detecting whether the mobile electronic device is moving and the speed of the movement, thermometer for measuring the temperature change near the mobile electronic device, proximity sensor for detecting the proximity of the mobile electronic device to another object (e.g., a hand, desk, or other object), light sensor for measuring the ambient light around the mobile electronic device, imaging sensor (e.g., camera) for capturing digital images of objects near the mobile electronic device, location sensors (e.g., Global Positioning System (GPS)) for determining the location (e.g., in terms of latitude and longitude) of the mobile electronic device, near field communication (NFC) sensors, Bluetooth sensors, etc. This disclosure contemplates that a mobile electronic device may include any applicable type of sensors. These sensors may provide various types of sensor data, which may be analyzed to determine that the user has picked up his or her mobile device in the locked state and will be imminently performing an unlock operation.

FIG. 1 illustrates an example mobile electronic device 100. In particular embodiments, mobile electronic device 100 may include processor 110, memory 120, communication component 130 (e.g., antenna and communication interface for wireless communications), and a number of sensors 150 of various types (e.g., touch sensor, accelerometer, thermometer, proximity sensor, light sensor, imaging sensor, etc.). In particular embodiments, a sensors hub 140 may optionally be included in mobile device 100. Sensors 150 may be connected to sensors hub 140, which may be a low power-consuming processor that controls sensors 150, manages power for sensors 150, processes sensor inputs, aggregates sensor data, and performs certain sensor functions. In addition, in particular embodiments, some types of sensors 150 may be connected to a controller 160. In this case, sensors hub 140 may be connected to controller 160, which in turn is connected to sensor 150. Alternatively, in particular embodiments, there may be a sensor monitor in place of sensors hub 140 for managing sensors 150.

Figure 2:
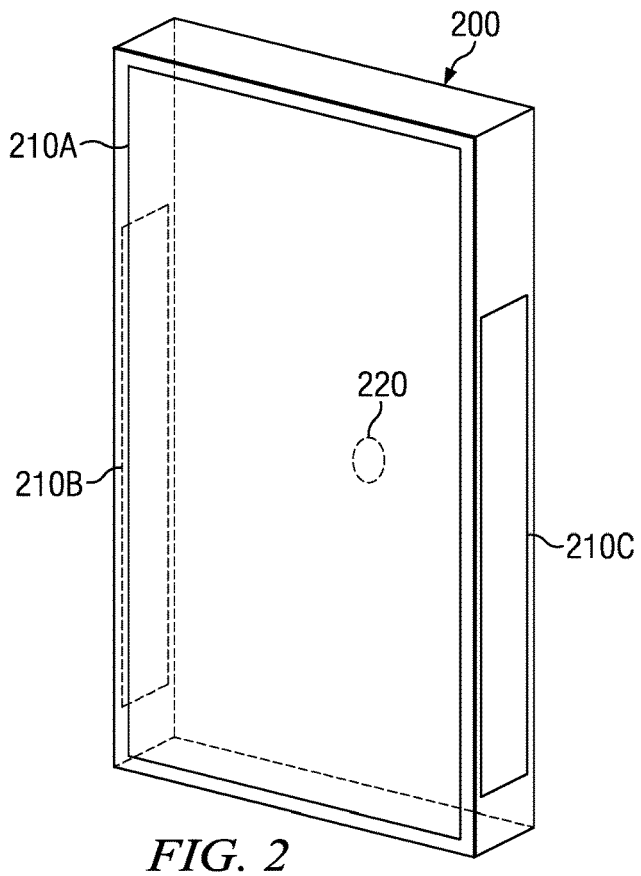
FIG. 2 illustrates the exterior of an example mobile device.

In particular embodiments, mobile electronic device 100 (e.g., a mobile device) may have a touchscreen as its input component. FIG. 2 illustrates the exterior of an example mobile device 200. Mobile device 200 has six sides: front, back, top, bottom, left, and right. Touch sensors may be placed anywhere on any of the six sides of mobile device 200. For example, in FIG. 2, a touchscreen incorporating touch sensors 210A is placed on the front of mobile device 200. The touchscreen may function as an input/output (IO) component for mobile device 200. In addition, touch sensors 210B and 210C are placed on the left and right sides of mobile device 200, respectively. Touch sensors 210B and 210C may detect a user's hand touching the sides of mobile device 200. In particular embodiments, touch sensors 210A, 210B, 210C may be implemented using resistive, capacitive, and/or inductive touch sensors. The electrodes of the touch sensors 210A, 210B, 210C may be arranged on a thin solid piece of material or a thin wire mesh. In the case of capacitive touch sensors, there may be two types of electrodes: transmitting and receiving. These electrodes may be connected to a controller (e.g., controller 160 illustrated in FIG. 1), which may be a microchip designed to drive the transmitting electrodes with electrical pulses and measure the changes in capacitance from the receiving electrodes caused by a user's touches in order to detect the locations of the user touches.

Of course, mobile device 200 is merely an example. In practice, a device may have any number of sides, and this disclosure contemplates devices with any number of sides. The touch sensors may be placed on any side of a device.

In particular embodiments, mobile device 200 may have a proximity sensor 220 (e.g., an infrared LED (light-emitting diode)) placed on either its front or back side. Proximity sensor 220 may be able to supply sensor data for determining its proximity, and thus the proximity of mobile device 200, to another object.

Figure 3:
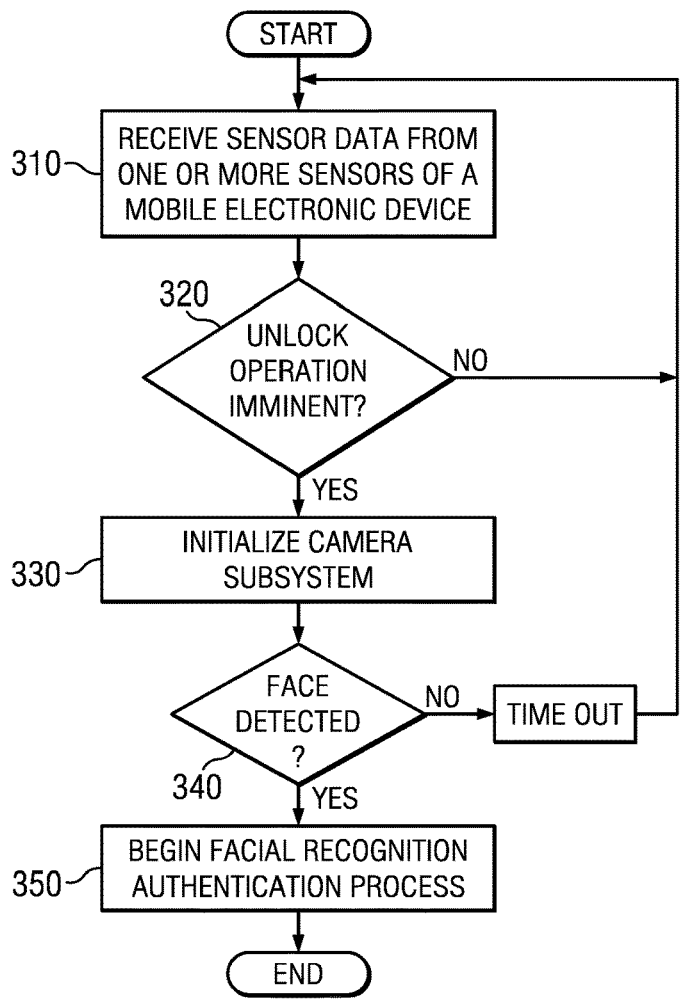
FIG. 3 illustrates an example method for automatically initializing the camera subsystem of a mobile device in response to sensor inputs indicative of an impending unlock operation.

FIG. 3 illustrates an example method for automatically initializing the camera subsystem of a mobile electronic device (e.g., mobile electronic device 100 illustrated in FIG. 1 or mobile device 200 illustrated in FIG. 2) based on a detected sensor inputs. In particular embodiments, a mobile electronic device may include any number of sensors of various types. These sensors may provide various types of sensor data. A processor within the mobile device (either processor 110, sensor hub 140, or controller 160) continuously monitors the sensors for inputs to one or more sensors. Upon receiving sensor data from one or more such sensors, as illustrated in STEP 310, the sensor data may be processed and analyzed to estimate or detect the whether an unlock operation is imminent, as illustrated in STEP 320. If the processor determines that an unlock operation is imminent, at STEP 330 the processor automatically initializes the camera subsystem in preparation of image capture. At STEP 340, mobile device 200 applies facial recognition algorithms to determine whether a face is present in the capture area of the lens. After a predetermined period of time, if no face is detected, the process times out and the system returns to the unlock state. At STEP 350, upon detection of a face, mobile device 200 begins optical authentication procedures, such as matching the captured face or iris to a prestored image of an authenticated user's face or irises. The steps illustrated in FIG. 3 are explained in more detail using the following examples.

As an example, suppose that a user has a mobile device that is stored in the user's pocket. Thus, the mobile device is currently in the locked state. When the user desires to use the mobile device, the user may reach into his pocket, grab hold of the mobile device, and take it out of the pocket. In particular embodiments, while in the locked state, a processor of the device (such as a main CPU or a controller) may periodically wake up (for example, every 100 milliseconds) and poll one or more sensors to detect if a user has picked the device. Alternatively, in particular embodiments, the CPU may be waken up by other means without having to specifically poll the sensors. For example, the CPU may be woken up through an interrupt signal or event or by dumb circuit.

In particular embodiments, in addition to the front side, the mobile device may have touch sensors on the left and right sides. Optionally, the mobile device may also have touch sensors on the back, top, or bottom side (e.g., mobile device 200 illustrated in FIG. 2). Thus, as the user's hand touches the mobile device to grab hold of it, the touch sensors may detect the user's fingers or palm touching the mobile device. The touch-sensor data may be analyzed to determine when and where the user has touched the mobile device. When the user touches the mobile device, it may be an indication that the user may wish to use the mobile device.

In particular embodiments, the placement of touch sensors on the left, right, top, and/or bottom sides may indicate whether a user is touching both sides of the mobile device (i.e., the user is grasping the mobile device). Thus, the touch sensors can differentiate grasping the mobile device in addition to simply touching it. In particular embodiments, being able to detect that the user has grasped the mobile device may yield a more accurate, and thus better, indication of the user's intention.

In particular embodiments, the mobile device may have an accelerometer in addition or instead of the touch sensors on the left and right sides. Again, sometimes, the user may put his hand in the pocket where the mobile device is stored and thus touch the mobile device even when the user does not intend to use the mobile device at that time. If the mobile device also has an accelerometer, the sensor data provided by the accelerometer may also be used to estimate whether the user intends to use the mobile device. When the mobile device is stored in the user's pocket, it may move as the user moves. However, such movements usually are relatively slow. On the other hand, when the user grabs hold of the mobile device and takes it out of the pocket to bring it in front of the user's face, there may be a relatively sudden increase in the movement speed of the mobile device. This change in the mobile device's movement speed may be detected based on the sensor data supplied by the accelerometer. In particular embodiments, upon detecting that there is a significant increase in the speed of the mobile device's movement, either by itself or in addition to detecting that the user has touched the mobile device, the mobile device processor may determine that an unlock operation is imminent.

In particular embodiments, the mobile device may have a Gyrometer in addition or instead of the touch sensors on the left and right sides. A Gyrometer, also known as a gyroscope, is a device for measuring the orientation along one or more axis. In particular embodiments, a Gyrometer may be used to measure the orientation of the mobile device. When the mobile device is stored in the user's pocket, it may stay mostly in one orientation. However, when the user grabs hold of the mobile device and takes it out of the pocket to bring it in front of the user's face, there may be a relatively sudden change in the orientation of the mobile device. The orientation of the mobile device may be detected and measured by the gyrometer. If the orientation of the mobile device has changed significantly, it may be another indication that the user may have taken the device out of his pocket, or from a flat surface, such as resting on a table, to a more vertical orientation, as when a users lifts his or her phone from a table to view near the user's face.

In particular embodiments, the mobile device may have a light sensor. When the mobile device is stored in the user's pocket, it is relatively dark around the mobile device. On the other hand, when the user brings the mobile device out of his pocket, it may be relatively bright around the mobile device, especially during day time or in well-lit areas. The sensor data supplied by the light sensor may be analyzed to detect when a significant change in the ambient light level around the mobile device occurs. In particular embodiments, upon detecting that there is a significant increase in the ambient light level around the mobile device, either by itself or in addition to detecting that the user has touched the mobile device or in addition to detecting that there is a significant increase in the speed of the mobile device's movement, the mobile device processor may ascertain that an unlock operation is imminent.

In particular embodiments, the mobile device may have a proximity sensor. The sensor data supplied by the proximity sensor may be analyzed to detect when the mobile device is in close proximity to a specific object, such as the user's hand. For example, as illustrated in FIG. 2, mobile device 200 may have an infrared LED 220 (i.e., proximity sensor) placed on its back side. When the user holds such a mobile device in his hand, the palm of the user's hand may cover infrared LED 220. As a result, infrared LED 220 may detect when the user's hand is in close proximity to mobile device 200. In particular embodiments, upon detecting that the mobile device is in close proximity to the user's hand, either by itself or in combination with other types of sensor indications, the mobile device may determine that an unlock operation is imminent.

Alternatively to or in conjunction with a back-facing proximity sensor, mobile device 200 may have a front-facing proximity sensor, to detect whether the front of the device is near an object (such as a face when used for voice communications). In particular embodiments, when the phone is in a lock mode, the presence of an object to the front facing proximity sensor may indicate that mobile device 200 is in a pocket, bag, or case, and a sudden transition from a positive proximity sensor reading (object detected) to a negative proximity sensor reading (no objects detected) may indicate that mobile device 200 has been taken out of the pocket, bag, or case, and may signify an impending unlock operation.

In particular embodiments, sensor hub 140 may include a microphone that periodically captures ambient audio waveforms. Transitions from quiet environments to noisy environments occur with some regularity, but, coupled with the other sensor transitions as described above, they may indicate that mobile device 200 was removed from a bag, pocket, purse, or other type of carrying case and indicate that an unlock operation is imminent. Additionally, waveform analysis may be performed by one or more processors in mobile device 200 to determine whether sound is muffled or clear. In particular embodiments, this waveform analysis is performed through the use of Fast Fourier Transforms, wavelet analysis, or other frequency-domain analysis. For example, muffled sound is commonly associated with high amplitude low frequency bands and low amplitude high frequency bands. This disclosure contemplates any suitable manner of detecting muffled and clear audio waveforms. In particular embodiments, transitions from muffled to clear audio environments indicates that an unlock operation is imminent.

A mobile device may have any number of sensors of various types, and these sensors may supply different types of sensor data. Different combinations of the individual types of sensor data may be used together to determine whether an unlock operation is imminent. Sometimes, using multiple types of sensor data in combination may yield a more accurate, and thus better, estimation of the user's intention to unlock the mobile device at a given time than only using a single type of sensor data. Nevertheless, it is possible to estimate the user's intention to unlock a mobile device using a single type of sensor data (e.g., touch-sensor data).

One or more combinations of the various sensor data is generally sufficient to capture all the possible scenarios in which a user may wish to unlock his or her mobile device, including but not limited to: removing the mobile device from a pocket; removing the mobile device from a bag or case; lifting a mobile device from a flat surface such as a table; lifting the mobile device from a docked position; flipping over the mobile device; and the like. This disclosure contemplates any suitable combination of sensor inputs in determining whether the user of a mobile device intends to unlock the mobile device.

In particular embodiments, the identity of the user currently handling the mobile device may be verified. If the user currently handling the mobile device is the true owner of the mobile device, the mobile device may be unlocked automatically. On the other hand, if the identity of the user currently handling the mobile device cannot be verified satisfactorily, the user may be prompted and required to provide a password or PIN in order to unlock and use the mobile device.

There may be various means to verify a user's identity. As the user brings the mobile device in front of his face, the camera of mobile device 200 may analyze captured digital images of the objects in front of its lens in order to detect and capture the user's face. These images may be analyzed using one or more suitable facial recognition algorithms to locate and compare the user's face to the face of the owner of the mobile device (e.g., the face stored on file in connection with the mobile device). If there is a sufficient amount of similarity between the two faces (i.e., a match), then the user currently handling the mobile device may be verified as the actual owner of the mobile device, and the mobile device may be unlocked without asking the user to explicitly provide a password or PIN. The image representing the face of the owner of the mobile device may be stored on the mobile device itself or elsewhere (e.g., on a server accessible to the mobile device). In some implementations, multiple different images of the user's face may be stored. In some implementations, the captured imaged of the user's face (if a match is successful) may be stored for later comparison. In some implementations, a set of captured images of the user's face may be stored an used in a comparison. The set of captured images can be stored in a ring or circular buffer structure where the last captured image overwrites the oldest image in the set of images.

In particular embodiments, the user may authorize guest users, and the mobile device may store photos of authorized guest users' faces for comparison. In particular embodiments, the user may define a set of access rights or use privileges for each guest user, or may apply a global setting to all guest users.

In particular embodiments, the camera of mobile device 200 may analyze captured digital objects in front of its lens in order to capture the user's iris. Iris-recognition algorithms may be utilized to match an authorized user's iris to the captured iris. If there is a sufficient amount of similarity between the two irises, then the user currently handling the mobile device may be verified as the actual owner of the mobile device.

In particular embodiments, the user of the mobile device may be a member of a social-networking system. A social network, in general, is a social structure made up of entities, such as individuals or organizations, that are connected by one or more types of interdependency or relationships, such as friendship, kinship, common interest, financial exchange, dislike, or relationships of beliefs, knowledge, or prestige. In more recent years, social networks have taken advantage of the Internet. There are social-networking systems existing on the Internet in the form of social-networking websites. Such social-networking websites enable their members, who are commonly referred to as website users, to perform various social activities. For example, the social-networking website operated by Facebook, Inc. at www.facebook.com enables its users to communicate with their friends via emails, instant messages, or blog postings, organize social events, share photos, receive news of their friends or interesting events, play games, etc.

The user may have a profile with the social-networking system that includes information relevant to the user (e.g., demographic data, social connections and activities, interests, hobbies, etc.). In particular embodiments, the information found in the user's profile may also be used to help determine the user's intention with respect to the mobile device at a given time or estimate the user's identity. For example, if, based on the user's calendar stored with the social-networking system, it may be determined that the user is attending an event (e.g., a meeting), then the mobile device may be transitioned to a state where the screen is turned off and the input component is locked. As another example, it may be determined, based on the information available with the social-networking system, that the user is with his social connections (e.g., friends) at a given time and location. If the mobile device is in an atypical location for its owner, but at the same time, several of the owner's family members or friends are also there, this may suggest that the mobile device is with its true owner, in which case, the device may be unlocked without requiring a password or PIN. On the other hand, if the mobile device is in an atypical location and none of its owner's social connections is there, a password or PIN may be required to unlock the device to ensure that the user of the device is indeed its true owner.

In particular embodiments, mobile device 200 may use the image utilized for facial recognition unlocking on the social network. In particular embodiments, the mobile device may prompt the user as to whether he or she would like to update the user's profile picture on the social network. Upon an affirmative confirmation that the user would like to use the newly captured image as a profile picture, mobile device 200 may automatically upload the picture to the social network via a wireless data network. In particular embodiments, mobile device 200 automatically uploads the captured image as the user's new profile picture. In particular embodiments, mobile device 200 uploads the newly-captured image into a special album on the user's profile, thus generating a slideshow of facial recognition photos. In particular embodiments, this slideshow may be converted into a video documenting how the user has aged or progressed over a significant period of time. This disclosure contemplates any suitable manner of leveraging the facial recognition image on the social networking system.

In particular embodiments, detection of an impending unlock process may affect the settings of the user account associated with mobile device 200 on a social networking system. For example, a social networking system may include one or more instant messaging clients. After a period of inactivity, the user's presence on the instant messaging system may be dropped or altered to an "idle" state. However, upon mobile device 200 determining that sensor inputs indicate the user had picked up mobile device 200 and will be looking at the screen, mobile device 200 may, either prior to or after authentication, update or alter the user's online status to "available" or "active." In particular embodiments, the photo captured by mobile device 200 for use in facial recognition may be uploaded as the user's instant messaging avatar.

In particular embodiments, mobile device 200 may perform various actions in anticipation of likely actions following an unlock event. For example, upon determining that an unlock event is imminent, mobile device may begin to download notifications and commonly viewed content, such as a newsfeed, from a social networking system. In particular embodiments, the actions may be tailored to the specific user based on previous habits. For example, if mobile device 200 determines that the user of the device habitually checks certain news sites or RSS feeds every time the user unlocks the phone, mobile device 200 may begin to automatically pull content from the sites when an unlock operation is imminent. In particular embodiments, the time of day and day of week may also affect which actions mobile device 200 initiates upon detecting an imminent unlocking operation. In particular embodiments, the user's location may affect what actions are performed by mobile device 200. For example, if the user has moved to an area that is neither his home nor his office, mobile device 200 may begin pulling nearby points of interest for a check-in operation. In particular embodiments, when the user has traveled greater than a predetermined distance, mobile device may begin pulling content from the social network for an "around me" page.

Figure 4:
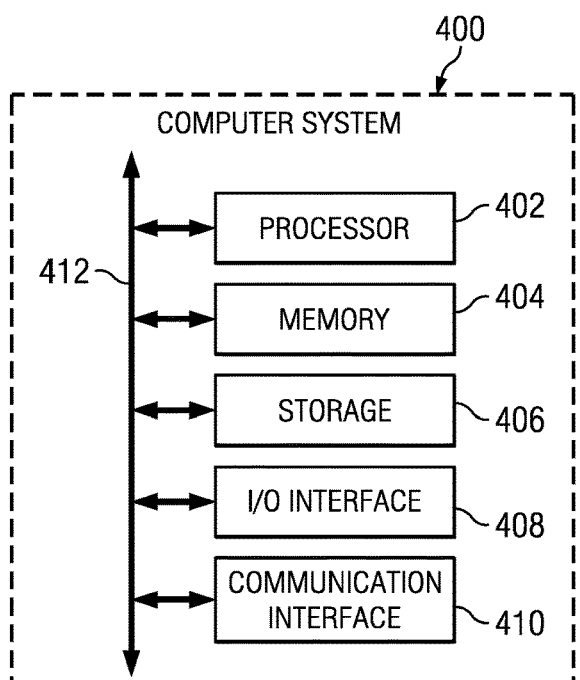
FIG. 4 illustrates an example computer system.

Particular embodiments may be implemented on one or more computer systems. FIG. 4 illustrates an example computer system 400. In particular embodiments, one or more computer systems 400 perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 400 may include one or more computer systems 400; be unitary or distributed; span multiple locations; span multiple machines; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

In particular embodiments, computer system 400 includes a processor 402, memory 404, storage 406, an input/output (I/O) interface 408, a communication interface 410, and a bus 412. In particular embodiments, processor 402 includes hardware for executing instructions, such as those making up a computer program. Where appropriate, processor 402 may include one or more arithmetic logic units (ALUs); be a multi-core processor; or include one or more processors 402. In particular embodiments, memory 404 includes main memory for storing instructions for processor 402 to execute or data for processor 402 to operate onOne or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM.

In particular embodiments, storage 406 includes mass storage for data or instructions. As an example and not by way of limitation, storage 406 may include an HDD, a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). This disclosure contemplates mass storage 406 taking any suitable physical form. Storage 406 may include one or more storage control units facilitating communication between processor 402 and storage 406, where appropriate.

In particular embodiments, I/O interface 408 includes hardware, software, or both providing one or more interfaces for communication between computer system 400 and one or more I/O devices. Computer system 400 may include one or more of these I/O devices, where appropriate. One or more of these I/O devices may enable communication between a person and computer system 400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer systems 400 or one or more networks. As an example and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example and not by way of limitation, computer system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface. In particular embodiments, bus 412 includes hardware, software, or both coupling components of computer system 400 to each other. Bus 412 may include one or more buses 412, where appropriate. Although this disclosure describes and illustrates a particular bus, this disclosure contemplates any suitable bus or interconnect.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. § 101. Herein, reference to a computer-readable storage medium excludes transitory forms of signal transmission (such as a propagating electrical or electromagnetic signal per se) to the extent that they are not eligible for patent protection under 35 U.S.C. § 101. A computer-readable non-transitory storage medium may be volatile, non-volatile, or a combination of volatile and non-volatile, where appropriate.

This disclosure contemplates one or more computer-readable storage media implementing any suitable storage. In particular embodiments, a computer-readable storage medium implements one or more portions of processor 402 (such as, for example, one or more internal registers or caches), one or more portions of memory 404, one or more portions of storage 406, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA, C, or C++. In particular embodiments, software is expressed in Hyper Text Markup Language (HTML), Extensible Markup Language (XML), or other suitable markup language.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

The invention claimed is:

1. A method comprising:
   by a computing device, monitoring a plurality of sensors comprising first and second sensors, wherein each of the first and second sensors is one of an accelerometer, a gyrometer, a proximity sensor, or a microphone, and wherein the computing device is in a locked state;
   by the computing device, identifying, based on information associated with an authorized user of the computing device, content to be downloaded from a social-networking system;
   by the computing device, receiving input from the first and second sensors of the computing device in the locked state;
   by the computing device, in response to receiving input from the first and second sensors indicating that an unlock operation is imminent:
      initializing a camera subsystem of the computing device to prepare for image capture; and
      downloading the identified content from the social-networking system, wherein the identified content is stored for display after the computing device is unlocked;
   by the computing device, in response to camera initialization, monitoring the input from the camera subsystem for the presence of a face;
   by the computing device, detecting, in the input from the camera subsystem, a face of a current user; and
   by the computing device, unlocking the computing device when the detected face of the current user matches a pre-stored image representing a face of the authorized user of the computing device.

2. The method of claim 1, wherein the downloading comprises downloading one or more notifications from the social-networking system.

3. The method of claim 1, wherein the identified content comprises newsfeed information.

4. The method of claim 1, further comprising:
   by the computing device, determining that the user of the device checks one or more news sites or feeds each time the user unlocks the computing device,
   wherein downloading the identified content by the computing device in response to receiving the input from the first and second sensors indicating that an operation to unlock the computing device is imminent includes downloading content from the news sites or feeds.

5. The method of claim 1, further comprising:
   by the computing device, detecting input from the plurality of sensors, wherein each of the plurality of sensors is of a different type, and
   wherein the unlock operation is imminent when the input from each of the plurality of sensors indicates a change in an environment related to the computing device.

6. The method of claim 5, wherein the plurality of sensors comprises a light sensor, and the unlock operation is imminent at least when input from the light sensor indicates an increase in an ambient light level.

7. The method of claim 1, further comprising:
   by the computing device, receiving a request to unlock the device, the request comprising authentication data; and
   by the computing device, determining whether to exit the locked state based at least in part on the authentication data and data associated with the authorized user in the social-networking system.

8. The method of claim 1, wherein the first sensor comprises an infrared Light-Emitting Diode (LED) proximity sensor on a back side of the computing device, and the unlock operation is imminent at least when input from the proximity sensor indicates that the computing device is in close proximity to an object.

9. The method of claim 8, wherein the second sensor comprises an infrared Light-Emitting Diode (LED) proximity sensor on a front side of the computing device, and the unlock operation is imminent at least when input from the proximity sensor indicates a transition from a positive proximity sensor reading indicating detection of an object to a negative proximity sensor reading indicating detection of no objects.

10. The method of claim 1, wherein the sensors comprise a microphone that periodically captures ambient audio waveforms, and the unlock operation is imminent at least when input from the microphone indicates a transition from a quiet environment to a noisy environment.

11. The method of claim 10, further comprising:
   by the computing device, performing waveform analysis to determine whether sound captured by the microphone is muffled or clear,
   wherein the unlock operation is imminent at least when the waveform analysis indicates a transition from a muffled audio environment to a clear audio environment.

12. The method of claim 1, further comprising automatically sending, by the computing device, an image of the detected face to the social-networking system in response to the unlocking of the computing device when the detected face of the current user matches a pre-stored image representing a face of the authorized user of the computing device.

13. The method of claim 1, further comprising automatically sending, by the computing device, an updated status of the authorized user to the social-networking system in response to receiving input from the first and second sensors indicating that an unlock operation is imminent.

14. A method comprising:
by a computing device, monitoring a plurality of sensors comprising first and second sensors, wherein the computing device is in a locked state;
by the computing device, receiving input from the first and second sensors of the computing device in the locked state;
by the computing device, in response to receiving input from the first and second sensors indicating that an unlock operation is imminent, initializing a camera subsystem of the computing device to prepare for image capture;
by the computing device, in response to camera initialization, monitoring the input from the camera subsystem for the presence of a face;
by the computing device, detecting, in the input from the camera subsystem, a face of a current user; and
by the computing device, unlocking the computing device when the detected face of the current user matches a pre-stored image representing a face of an authorized user of the computing device;
by the computing device, identifying, based on information associated with the authorized user, content to be downloaded from a social-networking system; and
by the computing device, downloading the identified content from the social-networking system, wherein the identified content is stored for display after the computing device is unlocked;
wherein the downloading is in response to receiving the input from the first and second sensors indicating that an operation to unlock the computing device is imminent, and
wherein the downloading is in response to determining that the user has moved to an area that is neither the user's home nor the user's office, and the identified content comprises nearby points of interest for a check-in operation.

15. A method comprising:
by a computing device, monitoring a plurality of sensors comprising first and second sensors, wherein the computing device is in a locked state;
by the computing device, receiving input from the first and second sensors of the computing device in the locked state;
by the computing device, in response to receiving input from the first and second sensors indicating that an unlock operation is imminent, initializing a camera subsystem of the computing device to prepare for image capture;
by the computing device, in response to camera initialization, monitoring the input from the camera subsystem for the presence of a face;
by the computing device, detecting, in the input from the camera subsystem, a face of a current user; and
by the computing device, unlocking the computing device when the detected face of the current user matches a pre-stored image representing a face of an authorized user of the computing device;
by the computing device, identifying, based on information associated with the authorized user, content to be downloaded from a social-networking system; and
by the computing device, downloading the identified content from the social-networking system, wherein the identified content is stored for display after the computing device is unlocked;
wherein the downloading is in response to receiving the input from the first and second sensors indicating that an operation to unlock the computing device is imminent, and
wherein the downloading is in response to determining that the user has traveled greater than a predetermined distance, and the identified content comprises content from the social-networking system for an "around me" page.

16. One or more computer-readable non-transitory storage media embodying software that is operable when executed to:
monitor a plurality of sensors of a computing device, the plurality of sensors comprising first and second sensors, wherein each of the first and second sensors is one of an accelerometer, a gyrometer, a proximity sensor, or a microphone, and wherein the computing device is in a locked state;
identify, based on information associated with an authorized user of the computing device, content to be downloaded from a social-networking system;
receive input from the first and second sensors of the device in the locked state;
in response to receiving input from the first and second sensors indicating that an unlock operation is imminent;
initialize a camera subsystem of the computing device to prepare for image capture; and
download the identified content from the social-networking system, wherein the identified content is stored for display after the computing device is unlocked;
in response to camera initialization, monitor the input from the camera subsystem for the presence of a face;
detect, in the input from the camera subsystem, a face of a current user; and
unlock the computing device when the detected face of the current user matches a pre-stored image representing a face of the authorized user of the computing device.

17. The storage media of claim 16, wherein the downloading comprises downloading one or more notifications from the social-networking system.

18. The storage media of claim 16, wherein the identified content comprises newsfeed information.

19. A system comprising:
one or more processors; and
one or more computer-readable non-transitory storage media coupled to one or more of the processors and comprising instructions operable when executed by one or more of the processors to cause the system to:
monitor a plurality of sensors of a computing device, the plurality of sensors comprising first and second sensors, wherein each of the first and second sensors is one of an accelerometer, a gyrometer, a proximity sensor, or a microphone, and wherein the computing device is in a locked state;
identify, based on information associated with an authorized user of the computing device, content to be downloaded from a social-networking system;
receive input from the first and second sensors of the computing device in the locked state;
in response to receiving input from the first and second sensors indicating that an unlock operation is imminent;
initialize a camera subsystem of the computing device to prepare for image capture; and download the identified content from the social-networking system, wherein the identified content is stored for display after the computing device is unlocked;

in response to camera initialization, monitor the input from the camera subsystem for the presence of a face;

detect, in the input from the camera subsystem, a face of a current user; and unlock the computing device when the detected face of the current user matches a pre-stored image representing a face of the authorized user of the computing device.

* * * * *